United States Patent [19]
Arnold et al.

[11] Patent Number: 5,987,260
[45] Date of Patent: Nov. 16, 1999

[54] SYSTEM FOR COUPLING COMMUNICATION LINK TO PORT CONNECTOR INCLUDING PREDEFINED GROUND PIN WHEN PERIPHERAL IS CONNECTED TO PORT CONNECTOR AND NOT MOUNTED IN COMPARTMENT

[75] Inventors: Kenneth W. Arnold, Houston; James J. Tumlinson, Tomball, both of Tex.

[73] Assignee: Compaq Computer Corporation, Houston, Tex.

[21] Appl. No.: 08/609,423

[22] Filed: Mar. 1, 1996

[51] Int. Cl.[6] ........................................................ G06F 13/00
[52] U.S. Cl. ................................................ 395/894; 395/882
[58] Field of Search ............................. 361/685; 395/500, 395/283, 309, 750, 822, 894, 882

[56] References Cited

U.S. PATENT DOCUMENTS

| | | | |
|---|---|---|---|
| 4,941,841 | 7/1990 | Darden et al. | 361/685 |
| 5,132,871 | 7/1992 | Densham et al. | 361/380 |
| 5,253,129 | 10/1993 | Blackborow et al. | 360/69 |
| 5,390,321 | 2/1995 | Proesel | 395/500 |
| 5,406,450 | 4/1995 | Shieh | 361/686 |
| 5,408,669 | 4/1995 | Stewart et al. | 395/750.01 |
| 5,495,586 | 2/1996 | Adachi et al. | 395/280 |
| 5,535,371 | 7/1996 | Stewart et al. | 395/500 |

OTHER PUBLICATIONS

EDGE: Work–Group Computing Report, v6, n264, p. 25, Jun. 1995.

*Primary Examiner*—Thomas C. Lee
*Assistant Examiner*—Anderson I. Chen
*Attorney, Agent, or Firm*—Akin, Gump, Strauss, Hauer & Feld, LLP

[57] ABSTRACT

A computer system has a housing and a central processing unit located inside the housing. The computer system also has a peripheral unit mounted in and removable from the housing and a communication port connector exposed on the outside of the housing for connection of and communication with external devices. The computer system has a dedicated communication link in the housing for communication with the peripheral unit. The computer system also has a device for connecting the peripheral unit to the port connector when the peripheral unit is removed from the housing and circuitry for coupling the dedicated communications link to the port connector when the peripheral unit is connected to the communication port connector. The computer system has a device for holding a portable disk drive constructed for insertion into an internal drive bay of a computer unit having a shell for covering and protecting the disk drive. The device has a cable assembly including a parallel port connector for connecting to the computer unit and a non-parallel port connector for connecting to a connector of the disk drive.

26 Claims, 5 Drawing Sheets

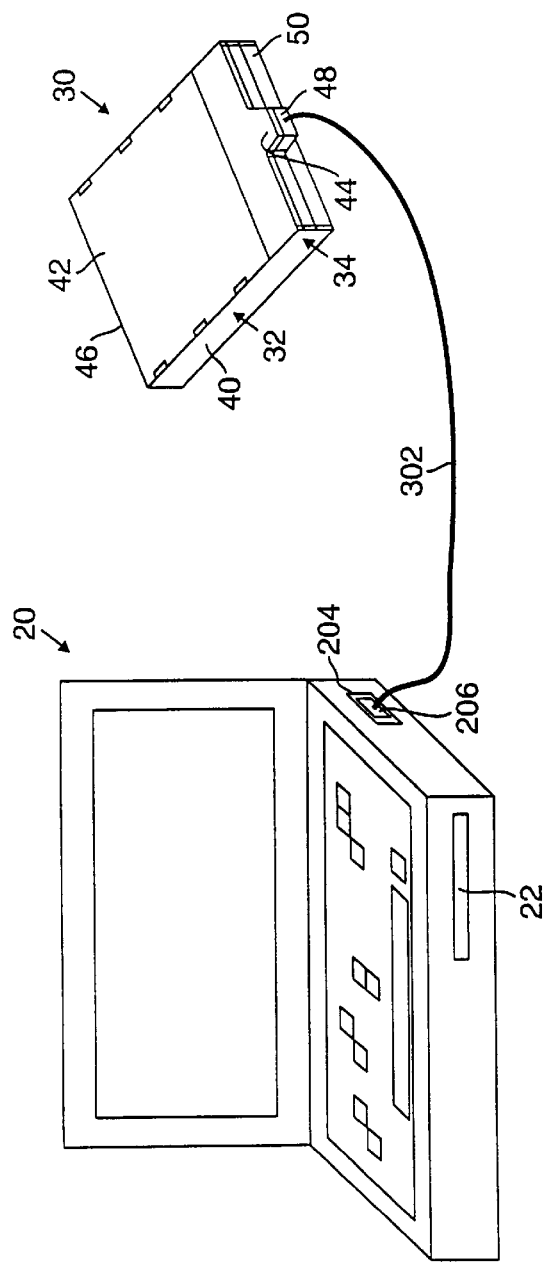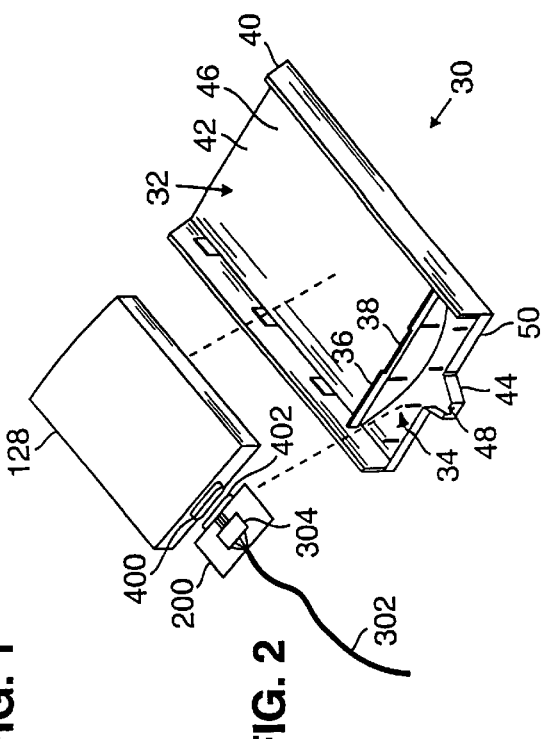
FIG. 1
FIG. 2

5,987,260

SYSTEM FOR COUPLING COMMUNICATION LINK TO PORT CONNECTOR INCLUDING PREDEFINED GROUND PIN WHEN PERIPHERAL IS CONNECTED TO PORT CONNECTOR AND NOT MOUNTED IN COMPARTMENT

BACKGROUND

The invention relates to a disk drive.

Many portable computer systems have internal bays which house removable modular internal floppy disk drives. When the floppy disk drive is removed, another device, such as a CD-ROM drive, may be inserted in the internal bay. Portable computer systems may also have free-standing external floppy disk drives with cables designed for use with a parallel port of the portable computer system.

SUMMARY

In general, in one aspect, the invention features a computer system having a housing and a central processing unit located inside the housing. The computer system also has a peripheral unit mounted in and removable from the housing and a communication port connector exposed on the outside of the housing for connection of and communication with external devices. The computer system has a dedicated communication link in the housing for communication with the peripheral unit. The computer system also has a device for connecting the peripheral unit to the communication port connector when the peripheral unit is removed from the housing and circuitry for coupling the dedicated communication link to the port connector when the peripheral unit is connected to the communication port connector.

Implementations of the invention may include one or more of the following features. The port connector may be a parallel port connector. The peripheral unit may be a disk drive. The computer system may be a portable computer system. The housing may have a bay for the peripheral unit and the bay is constructed to accept a substitute device. The dedicated communication link may be a floppy control bus. The circuitry for coupling the dedicated communication link to the communication port connector may include an input/output controller coupled to the dedicated communication link for allowing the central processing unit to communicate with the peripheral unit.

The device may include a cable with a cable port connector adapted to mate with the communications port connector. The device may include a circuit for providing an indication to the circuitry for coupling the dedicated communication link that the peripheral unit is connected to the communication port connector. The communication port connector may include a predefined ground pin for receiving the indication from the circuit for providing an indication that the peripheral unit is connected to the communication port connector, and the circuit for providing an indication furnishes the indication to the predefined ground pin.

The communication port connector may furnish a bias sense signal for reception by the circuit for providing an indication, and the circuit for providing an indication furnishes the indication that the peripheral unit is connected to the port connector when the circuit for providing an indication receives the bias sense signal. The circuit for providing an indication may be a wire for coupling the bias sense signal to the predefined ground pin for receiving the indicator when the peripheral unit is connected to the communication port connector.

In general, in another aspect, the invention features a computer system having a communication port connector for connection of and communication with external devices. The computer system has a dedicated communication link for communication with a peripheral unit and circuitry, coupled to the communication port connector, for detecting the connection of the peripheral unit to the communication port connector. The computer system also has circuitry responsive to the circuitry for detecting for coupling the dedicated communication link to the communications port connector when the peripheral unit is connected to the communication port connector.

Implementations of the invention may include one or more of the following features. The communication port connector may have a predefined ground pin for receiving an indication of the type of external device connected thereto, and the circuitry for detecting the connection detects the connection of the peripheral unit to the communication port connector when the peripheral unit provides an indication to the predefined ground pin that the peripheral unit is connected to the communication port connector.

The circuitry for coupling may be a multiplexer. The computer system may also have circuitry coupled to the communication port connector for generating a supply voltage on a predefined ground pin for powering the peripheral unit. The computer system may further also have circuitry coupled to the communication port connector for generating a bias voltage on a predefined ground pin of the communication port connector for indicating connection of the communication port connector to the peripheral unit.

The indication may be a logic one voltage level asserted on the predefined ground pin by the peripheral unit. The computer system may also have a circuit for indicating power on status to the peripheral unit. The peripheral unit may be a floppy drive. The peripheral unit may have a switch circuit for connecting the floppy drive to the communication port connector when the switch circuit is enabled, and the computer system may also have a circuit responsive to the circuit for detecting for enabling the switch circuit when the peripheral unit is connected to the communication port connector.

In general, in another aspect, the invention features a method for use in a computer system having a communication port connector and a dedicated communication link for communication with a peripheral device. The method has the steps of detecting connection of the peripheral device to the communication port connector and coupling the dedicated communication link to the communication port connector when the peripheral unit is connected to the communication port connector.

Implementations of the invention may include one or more of the following features. The step of detecting may monitor a predefined ground pin of the communication port connector for detection of connection of the peripheral unit to the communication port connector. The step of detecting may monitor the predefined ground pin for a logic one voltage level. The method may include another step of generating a supply voltage on a predefined pin of the communication port connector for powering the peripheral unit.

The method may also have the step of generating a bias voltage on a predefined ground pin of the communication port connector for indicating connection of the communication port connector to the peripheral unit. The method may also have the step of generating a power on status signal to the peripheral unit on a predefined ground pin of the communication port connector.

In general, in one aspect, the invention features a device for holding a portable disk drive constructed for insertion into an internal drive bay of a computer unit having a shell for covering and protecting the disk drive. The device also has a cable assembly having a parallel port connector for connecting to the computer unit and a non-parallel port connector for connecting to a connector of the disk drive.

Implementations of the invention may include one or more of the following features. The device may have a partition wall inside the shell for forming a first compartment for covering and protecting the disk drive and a second compartment for covering and protecting the non-parallel port connector. The partition wall may include a slot through which the non-parallel port connector extends.

The cable assembly may include a switch circuit for connecting the connector of the disk drive to the parallel port connector when the parallel port connector is connected to the computer and for disconnecting the connector of the disk drive from the parallel port connector when the parallel port connector is disconnected from the computer. The device may have a partition wall inside the shell for forming a first compartment for covering and protecting the disk drive and a second compartment for covering and protecting the switch circuit.

The invention may have one or more of the following advantages. The same floppy drive can be interchanged between the internal bay and the external shell. Sensing connection with the predefined ground pin minimizes harm to other external parallel port devices. Providing power to the floppy drive on a predefined ground pin does not require use of a signal pin of the communication port connector. No additional pins are required in the communication port connector.

Other advantages and features will become apparent from the following description and from the claims.

DESCRIPTION

FIG. 1 is a perspective view of a computer system;

FIG. 2 is an exploded view of the external disk drive assembly of FIG. 1 with the shoe housing the external disk drive having an orientation upside down from the orientation shown in FIG. 1;

Figure 3:
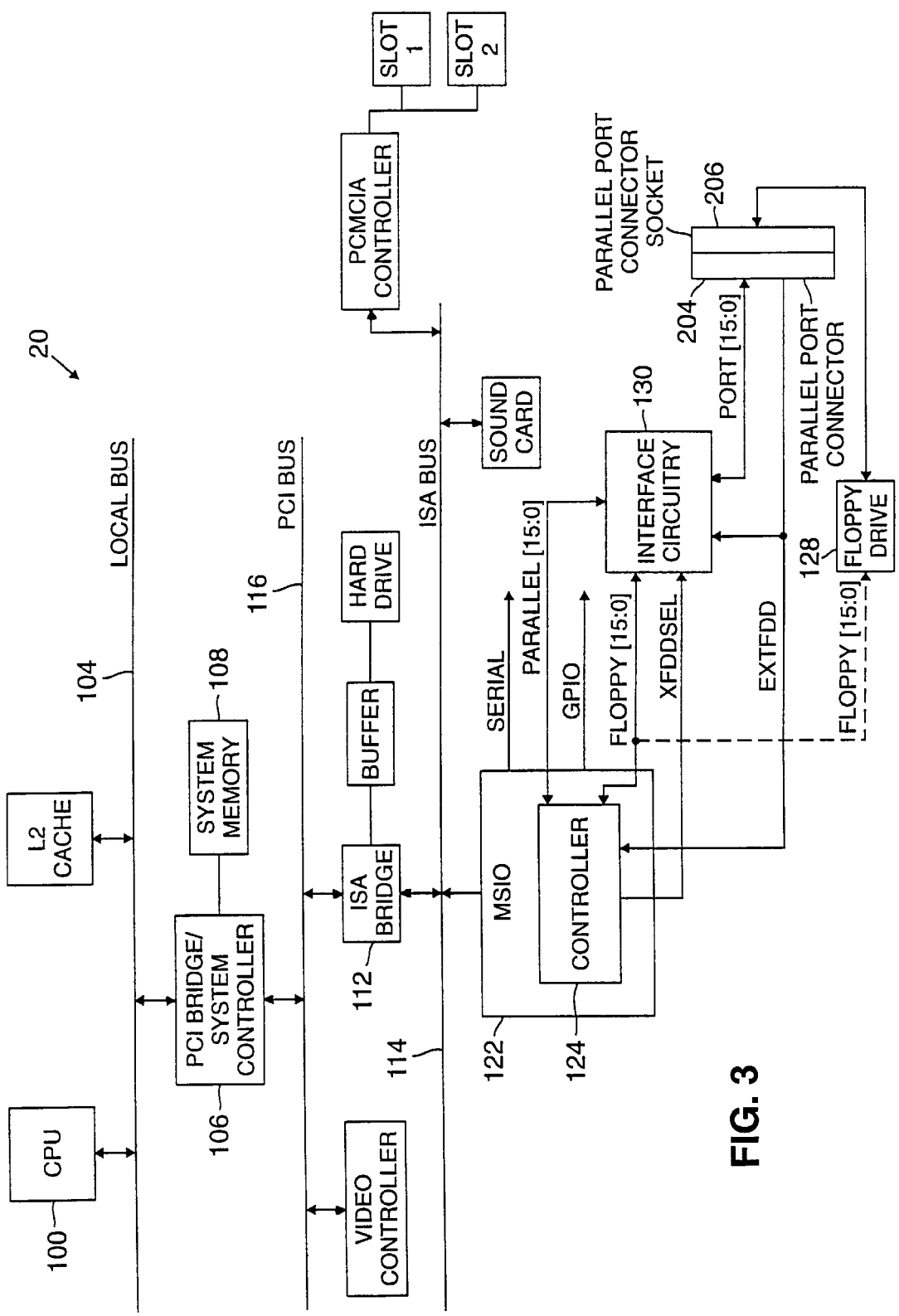
FIG. 3 is an electrical schematic diagram of the computer system of FIG. 1.

As shown in FIGS. 1 and 2, a shoe 30 furnishes a housing for an internal floppy disk drive 128 of a portable computer unit 20 when the floppy drive 128 is removed from an internal floppy drive bay 22 of the portable computer unit 20. The shoe 30 includes a compartment 32 for housing the floppy drive 128 and a compartment 34 for housing a circuit board 200 having circuitry for connecting the floppy drive 128 to the portable computer unit 20.

The portable computer unit 20 has a parallel port externally accessible through an external parallel port plug connector 204 (located either in the side or in the back of the portable computer unit 20). The floppy drive 128 is connected to the parallel port connector 204 through a parallel cable 302. The parallel cable 302 has a parallel port socket connector 206 that plugs into the connector 204.

The floppy drive 128 has a floppy drive connector 400 used to electrically couple the floppy drive 128 to either the parallel port or to the internal drive bay 22. Regardless of whether the floppy drive 128 is connected to the internal drive bay 22 or to the parallel port, the drive number of the floppy drive 128 remains unchanged.

The shoe 30 has a top plate 42 and two sidewalls 40 integral with the top plate 42 which form a U-shaped channel for housing the floppy drive 128. The floppy drive 128 is inserted into an open end 46 of the shoe 30 into the compartment 32, and when inserted, the floppy drive 128 abuts against an internal partition wall 36 which separates the shoe 30 into the compartments 32 and 34. The circuit board 200 is secured to the top plate 42 of the shoe 30. The partition wall 36 has an opening 38 through which the floppy drive connector 400 of the floppy drive 128 is extended and connected to a floppy drive connector socket 402 on the circuit board 200 when the floppy drive 128 is inserted into the shoe 30.

The shoe 30 further includes an overhang extension 44 of the top plate 42 near an end 50 of the shoe 30 proximal to the compartment 34. The overhang extension 44 has a resilient grip 48 for securing the parallel cable 302 to the shoe 30.

As shown in FIG. 3, the portable computer unit 20 has a Mobile Super Input/Output (MSIO) circuit 122 made by SMC. The MSIO circuit 122 includes a microcontroller 124 comparable to an 8051 microcontroller made by Intel. The microcontroller 124 controls operation of the floppy drive 128 through floppy drive signals FLOPPY[15:0] which are furnished to interface circuitry 130 and the drive bay 22. The microcontroller 124 controls communications to the parallel port through parallel port signals PARALLEL[15:0] which are furnished to the interface circuitry 130.

The interface circuitry 130 selects which signals, represented by PORT[15:0], are furnished to the parallel port connector 204. The PORT[15:0] signals may either be the floppy drive signals FLOPPY[15:0] or the parallel port signals PARALLEL[15:0]. The interface circuitry 130 receives from the parallel port connector 204 an external floppy drive detect signal EXTFDD which when asserted, or high, indicates the floppy drive 128 is connected to the parallel port connector 204. The EXTFDD signal is deasserted, or low, otherwise. The EXTFDD signal is also provided to the microcontroller 124 for detection of insertion and removal of the floppy drive 128 from and to the parallel port connector 204.

The microcontroller 124 furnishes a software external floppy drive select signal XFDDSEL to the interface circuitry 130. The assertion, or driving high, of the XFDDSEL signal instructs the interface circuitry 130 to select the parallel port as the floppy drive 128 connection if other conditions permit, such as another floppy drive 128 not being concurrently inserted in the internal drive bay 22. The deassertion, or driving low, of the XFDDSEL signal disables the floppy drive signals FLOPPY[15:0] from being provided to the parallel port connector 204. When the XFDDSEL signal is deasserted, the FLOPPY[15:0] signals are furnished to the internal drive bay 22.

The microcontroller 124 and MSIO 122 are interfaced to an Industry Standard Architecture (ISA) bus 114. The ISA bus 114 is coupled to an ISA bridge 112 which provides communication between a Peripheral Component Interconnect (PCI) bus 116 and the ISA bus 114.

Connected to the PCI bus 116 is a PCI bridge/system controller circuit 106. The circuit 106 allows the PCI bus 116 to communicate to a local processor bus 104 of the CPU 100. The circuit 106 also controls access to a system memory 108. The other circuitry shown in FIG. 3 need not be described in order to understand the invention.

Figure 4:
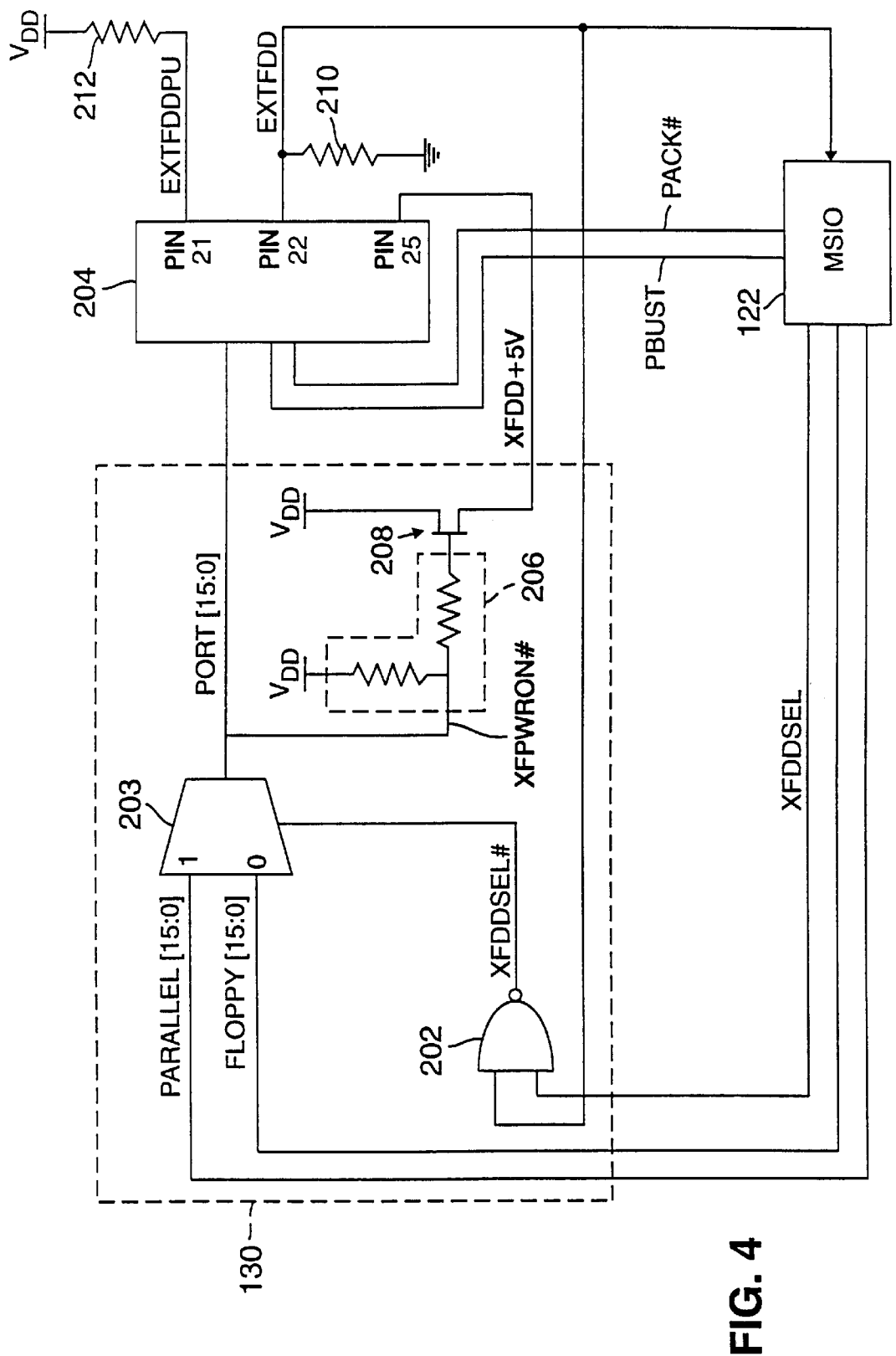
FIG. 4 is an electrical schematic diagram of the parallel port interface circuitry of FIG. 3.

As shown in FIG. 4, three conventional parallel port ground pins, Pin 21, Pin 22 and Pin 25 of the parallel port connector 204 are used to furnish power and sense connection of the floppy drive 128 to the parallel port connector 204. Pin 21 of the parallel port connector 204 furnishes a EXTFDDPU signal used to provide a bias voltage for detecting connection of the floppy drive 128 to the parallel port connector 204. Pin 21 is coupled to a supply voltage level VDD through a resistor 212.

Pin 22 of the parallel port connector 204 receives the external floppy drive detect signal EXTFDD. Pin 22 is coupled to ground through a resistor 210. This grounding pulls the EXTFDD signal low when nothing is connected to the parallel port connector 204. When the floppy drive 128 is connected to the parallel port connector 204, circuitry of the circuit board 200 couples the EXTFDDPU and EXTFDD signals together. This coupling results in a logic one voltage level for the EXTFDD signal which indicates the floppy drive 128 is connected to the parallel port connector 204. If a traditional parallel port device, such as a parallel printer, is coupled to the parallel port connector 204, then the conventional ground Pin 22 is grounded which deasserts the EXTFDD signal.

Pin 25 of the parallel port connector 204 furnishes a floppy disk drive supply voltage level XFDD+5V. Because Pin 25 is not a conventional signal pin, but rather a ground pin, potential harm to a non floppy drive device is reduced.

The output of a multi-bit bi-directional multiplexer 203 furnishes the PORT[15:0] signals. The zero input of the multiplexer 203 is connected to the floppy drive signals FLOPPY[15:0], and the one input of the multiplexer 203 is connected to the parallel port signals PARALLEL[15:0].

The select input of the multiplexer 203 receives an external floppy drive select signal XFDDSEL# from a NAND Gate 202. The NAND Gate 202 receives as its inputs the EXTFDD and XFDDSEL signals. Both the software enable signal XFDDSEL and the hardware enable signal EXTFDD must be asserted before the XFDDSEL# is asserted, or driven low, which allows the floppy drive signals FLOPPY[15:0] access to the parallel port connector 204.

The floppy drive signals FLOPPY[15:0] include an external floppy drive power on signal XFPWRON# furnished by the microcontroller 124, which when asserted, or low, activates the supply voltage level XFDD+5V. The XFPWRON# signal is coupled through a resistor divider network 206 to the gate of a P-channel metal-oxide-semiconductor field-effect-transistor (MOSFET) 208. The resistor divider network 206 and the drain of the MOSFET 208 are coupled to the voltage level $V_{DD}$. The source of the MOSFET 208 furnishes the XFDD+5V voltage level which provides power to the floppy drive 128.

Two additional parallel port signals, a parallel port busy signal PBUSY and a parallel port acknowledge signal PACK# are provided by the MSIO circuit 122 to the parallel port connector 204 but are not routed through the multiplexer 203 because these additional parallel port signals are used on pins of the parallel port connector 204 that are not used for any of the floppy drive signals FLOPPY[15:0].

Figure 5:
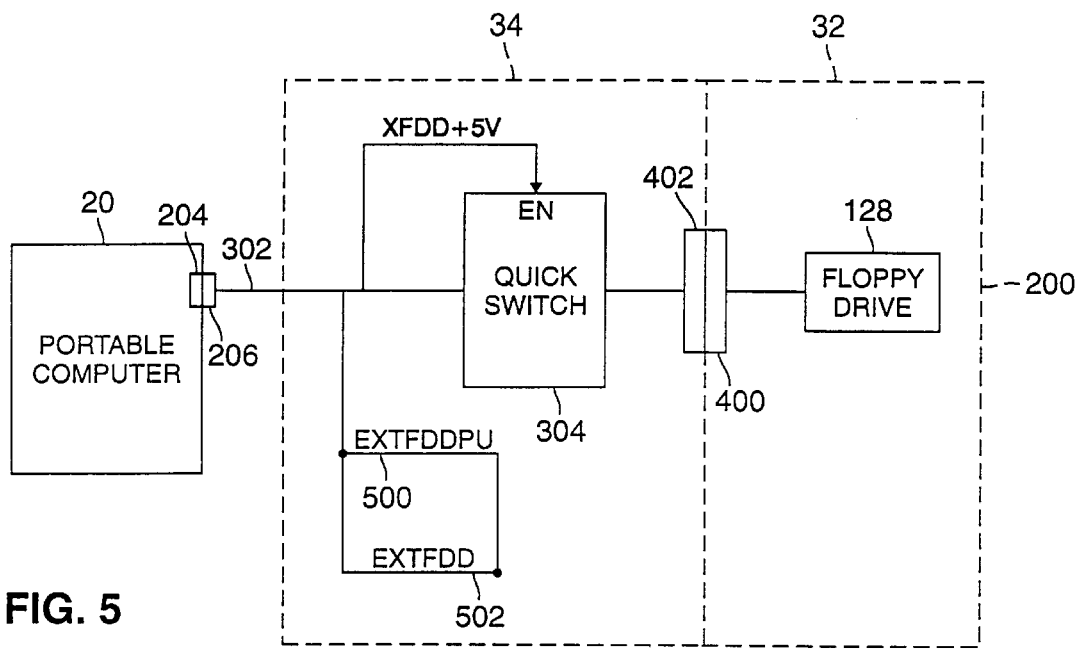
FIG. 5 is an electrical schematic diagram of the computer system of FIG. 1.

As shown in FIG. 5, a line 500 of the parallel cable 302 carrying the EXTFDDPU signal is electrically coupled to a line 502 of the parallel cable 302 carrying the EXTFDD signal. A Quick Switch circuit 304 is coupled between the lines of the parallel cable 302 and the floppy drive connector socket 402. The enable input of the Quick Switch 304 receives the supply voltage level XFDD+5V. When the XFPWRON# signal is asserted, the Quick Switch circuit 304 is enabled, and the Quick Switch circuit 304 allows the floppy drive signals FLOPPY[15:0] to pass through to the floppy drive 128. Otherwise, the Quick Switch circuit 304 electrically isolates the floppy drive 128 from the floppy drive signals FLOPPY[15:0]. Should the floppy drive 128 be erroneously plugged into a unit not designed for the floppy drive 128, the isolation provided by the Quick Switch circuit 304 minimizes damage to both the floppy drive 128 and the unit.

Positive and negative edge transitions of the EXTFDD signal generate a hardware interrupt to the microcontroller 124. This interrupt allows the microcontroller 124 to monitor the connection status of the floppy drive 128 to the parallel port connector 204.

Figure 6:
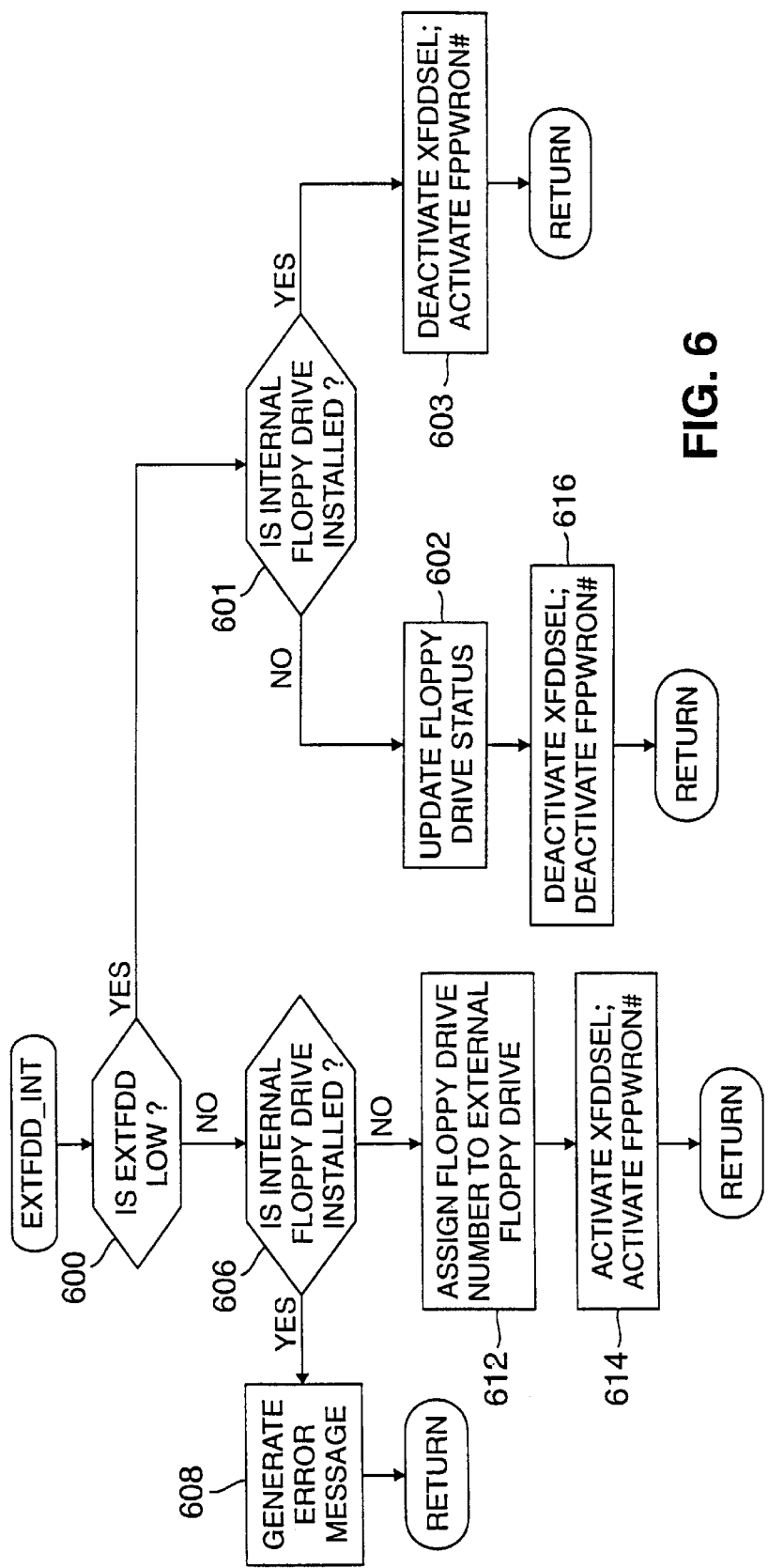
FIG. 6 is a flow diagram illustrating an external floppy drive detection routine.

As shown in FIG. 6, in an interrupt service routine to monitor the floppy drive 128 connection status, the microcontroller 124 determines 600 whether the EXTFDD signal is deasserted. If so, the microcontroller 124 determines 601 whether the internal drive bay 22 contains the floppy drive 128. If so, the microcontroller 124 deactivates 603 the XFDDSEL and FPPWRON# signals and terminates the interrupt service routine. If the internal drive bay 22 does not contain a floppy drive 128, then the microcontroller 124 updates 602 the floppy drive status of the portable unit 20 to reflect that the floppy drive 128 has been removed from the parallel port connector 204. The microcontroller 124 then deactivates 616 the XFDDSEL and FPPWRON# signals and terminates the interrupt service routine.

If the microcontroller 124 determines 600 the EXTFDD signal is asserted high, then this indicates that the floppy drive 128 is connected to the parallel port connector 204. The microcontroller 124 then determines 606 whether the internal drive bay 22 contains a floppy drive 128. If so, an error condition exists, as both drives are mapped to the same drive number and the microcontroller 124 generates 608 an error message. The microcontroller 124 then terminates the interrupt service routine.

If the microcontroller 124 determines 606 the floppy drive 128 has not been installed in the internal drive bay 22, then the microcontroller 124 assigns 612 the floppy drive number to the floppy drive 128 connected to the parallel part connector 204. Furthermore, the microcontroller 124 activates 614 the XFDDSEL and the FPPWRON# signals and terminates the interrupt service routine.

Other embodiments are within the scope of the following claims.

What is claimed is:

1. A computer system comprising:

a housing;

a central processing unit located inside the housing;

a peripheral unit mountable in and removable from a compartment in the housing;

a communication port connector exposed on the outside of the housing at a location separated from the compartment for connection of and communication with external devices;

a dedicated communication link in the housing for communication with the peripheral unit whether mounted in the compartment or connected to the communication port connector;

a device for connecting the peripheral unit to the communication port connector when the peripheral unit is removed from the housing;

circuitry for coupling the dedicated communication link to the communication port connector, in response to a peripheral being connected to the communication port connector and in the absence of a peripheral unit being mounted in the compartment; and wherein the communication port connector includes a predefined ground pin for receiving an indication from a circuit for providing an indication that the peripheral unit is connected to the communication port connector.

2. The computer system of claim 1, wherein the communication port connector comprises a parallel port connector.

3. The computer system of claim 1, wherein the peripheral unit comprises a disk drive.

4. The computer system of claim 1, where the computer system comprises a portable computer system.

5. The computer system of claim 1, wherein the housing comprises a bay for the peripheral unit and the bay is constructed to accept a substitute device.

6. The computer system of claim 1, wherein the dedicated communication link comprises a floppy control bus.

7. The computer system of claim 1, wherein the circuitry for coupling the dedicated communication link to the communication port connector includes an input/output controller coupled to the dedicated communication link for allowing the central processing unit to communicate with the peripheral unit.

8. The computer system of claim 1, wherein the device includes a cable with a cable port connector adapted to mate with the communications port connector.

9. The computer system of claim 1, wherein the device includes a circuit for providing an indication to the circuitry for coupling the dedicated communication link that the peripheral unit is connected to the communication port connector.

10. The computer system of claim 1, wherein the circuitry is further configured to isolate the communication link from the communication port connector when disconnection of the peripheral unit from the communication port connector is detected.

11. A method for use in a computer system having a communication port connector and a dedicated communication link for communication with a peripheral device, the method comprising the steps of:

detecting connection of the peripheral device to the communication port connector; and coupling the dedicated communication link to the communication port connector when the peripheral unit is connected to the communication port connector, wherein the step of detecting monitors a predefined around pin for a logical voltage level of the communication port connector for detection of connection of the peripheral unit to the communication port connector.

12. The method of claim 11 further comprising the step of generating a supply voltage on a predefined pin of the communication port connector for powering the peripheral unit.

13. The method of claim 11, further comprising the step of generating a bias voltage on a predefined ground pin of the communication port connector for indicating connection of the communication port connector to the peripheral unit.

14. The method of claim 11, further comprising the step of generating a power on status signal to the peripheral unit on a predefined ground pin of the communication port connector.

15. The method of claim 11, further comprising:

decoupling the communication link from the communication port connector when the peripheral unit is disconnected from the communication link.

16. A computer system comprising:

a housing;

a central processing unit located inside the housing;

a peripheral unit mounted in and removable from a compartment in the housing;

a communication port connector exposed on the outside of the housing at a location separated from the compartment for connection of and communication with external devices;

a dedicated communication link in the housing for communication with the peripheral unit whether mounted in the compartment or connected to the communication port connector;

a device for connecting the peripheral unit to the communication port connector when the peripheral unit is removed from the housing;

circuitry for coupling the dedicated communication link to the communication port connector when a peripheral unit is connected to the communication port connector and a peripheral unit is not mounted in the compartment;

wherein the communication port connector includes a predefined ground pin for receiving an indication from a circuit for providing an indication that the peripheral unit is connected to the communication port connector; and wherein the circuit for providing an indication furnishes the indication to the predefined ground pin.

17. The computer system of claim 16, wherein the circuitry for coupling comprises a multiplexer.

18. The computer system of claim 16, further comprising:

circuitry coupled to the communication port connector for generating a supply voltage on a predefined ground pin for powering the peripheral unit.

19. The computer system of claim 16 wherein said bias source comprises:

a bias voltage on a predefined ground pin of the communication port connector for indicating connection of the communication port connector to the peripheral unit.

20. The computer system of claim 16, wherein the indication comprises a logic one voltage level asserted on the predefined ground pin by the peripheral unit.

21. The computer system of claim 16, further comprising a circuit for indicating power on status to the peripheral unit.

22. The computer system of claim 16, where the peripheral unit comprises a floppy drive.

23. The computer system of claim 22 where the peripheral unit further includes a switch circuit for connecting the floppy drive to the communication port connector when the switch circuit is enabled, the computer system further comprising a circuit responsive to the circuit for detecting for enabling the switch circuit when the peripheral unit is connected to the communication port connector.

24. The computer system of claim 16, wherein the circuitry for coupling is also configured to isolate the communication link from the communication port connector when disconnection of the peripheral unit from the communication port connector is detected.

25. A computer system comprising:

a housing;

a central processing unit located inside the housing;

a peripheral unit mounted in and removable from the housing;

a communication port connector exposed on the outside of the housing for connection of and communication with external devices;

a dedicated communication link in the housing for communication with the peripheral unit whether mounted in the compartment or connected to the communication port connector;

a device for connecting the peripheral unit to the communication port connector when the peripheral unit is removed from the housing;

circuitry for coupling the dedicated communication link to the communication port connector when a peripheral unit is connected to the communication port connector and in the absence of a peripheral unit being mounted in the compartment;

wherein the communication port connector includes a predefined ground pin for receiving the indication from the circuit for providing an indication that the peripheral unit is connected to the communication port connector;

wherein the circuit for providing an indication furnishes the indication to the predefined ground pin wherein the communication port connector furnishes a bias sense signal for reception by the circuit for providing an indication, and wherein the circuit for providing an indication furnishes the indication that the peripheral unit is connected to the port connector when the circuit for providing an indication receives the bias sense signal.

26. The computer system of claim 25, wherein the circuit for providing an indication is a wire for coupling the bias sense signal to the predefined ground pin for receiving the indicator when the peripheral unit is connected to the communication port connector.

* * * * *